July 26, 1932.  O. L. COFFEY  1,868,792

MECHANICAL LOAD BRAKE

Filed Sept. 20, 1928  2 Sheets-Sheet 1

Inventor:-
Oscar L. Coffey
By Fred Galach
Atty.

July 26, 1932.  O. L. COFFEY  1,868,792
MECHANICAL LOAD BRAKE
Filed Sept. 20, 1928  2 Sheets-Sheet 2
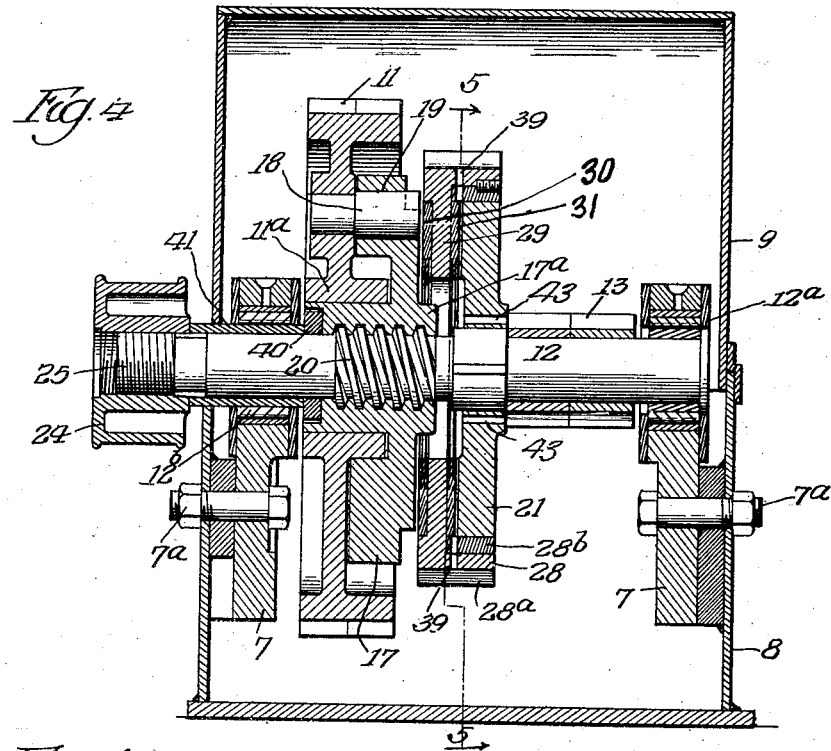
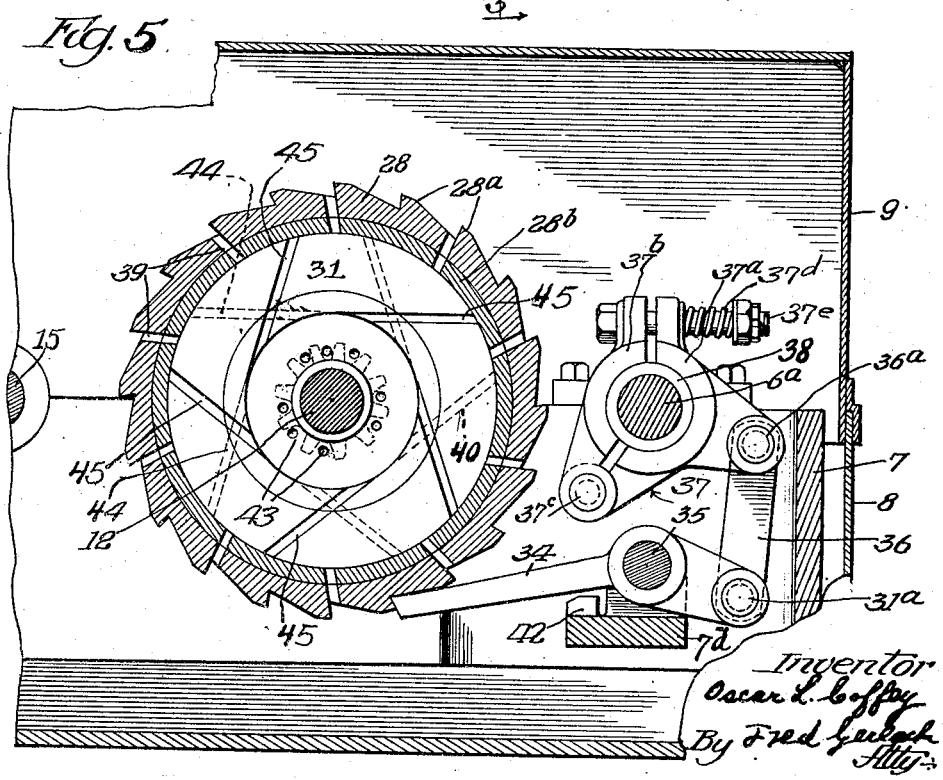

Patented July 26, 1932

1,868,792

UNITED STATES PATENT OFFICE

OSCAR L. COFFEY, OF HARVEY, ILLINOIS, ASSIGNOR TO WHITING CORPORATION, OF HARVEY, ILLINOIS, A CORPORATION OF ILLINOIS

MECHANICAL LOAD BRAKE

Application filed September 20, 1928. Serial No. 307,272.

The invention relates generally to mechanical load brakes. More particularly the invention relates to that type of load brake which is employed in motor-operated travelling cranes to prevent the load from dropping.

In load brakes of the friction disk type, it has been found that the friction to which the brake elements are subjected causes them to become excessively heated through failure of the lubricant to circulate across the coacting friction faces of the elements. The primary object of the present invention is to provide efficient means for causing the lubricant to circulate between the friction faces of the coacting brake elements to keep them cool and prevent excessive heating.

Another object of the invention is to provide lubricant circulating means for a load brake of this type by which the pinion, through which the hoisting drum is driven, will function to cause lubricant to circulate across the faces of the friction surfaces of the brake elements.

Another object of the invention is to improve the construction and operation of the load brake set forth in Letters Patent of the United States No. 1,795,058 granted to John S. Townsend on the 3d day of March, 1931.

Other objects of the invention and the various advantages and characteristics of the present load brake construction, will appear from a consideration of the following detailed description.

The invention consists in the several novel features hereinafter set forth and more particularly defined by claims at the conclusion hereof.

Figure 1:
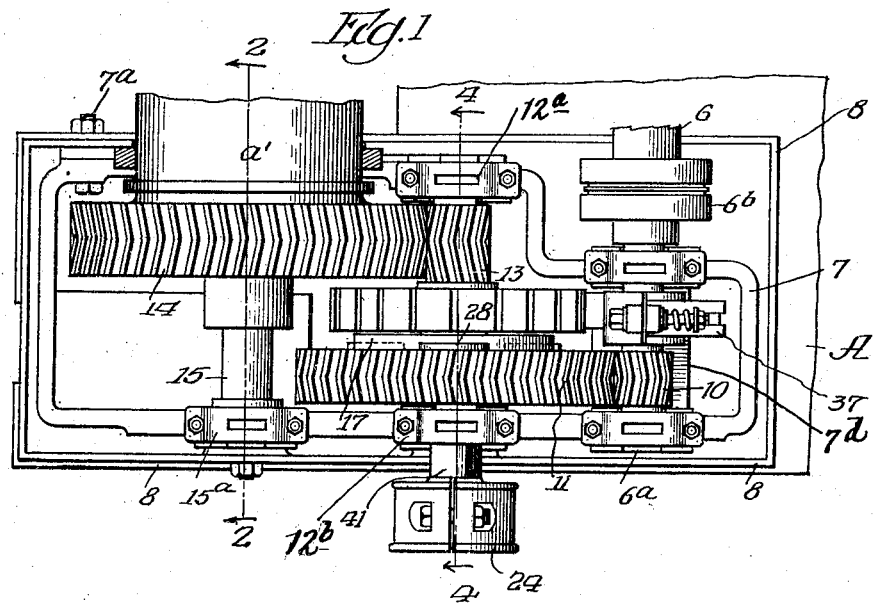
Figures 2, 3:
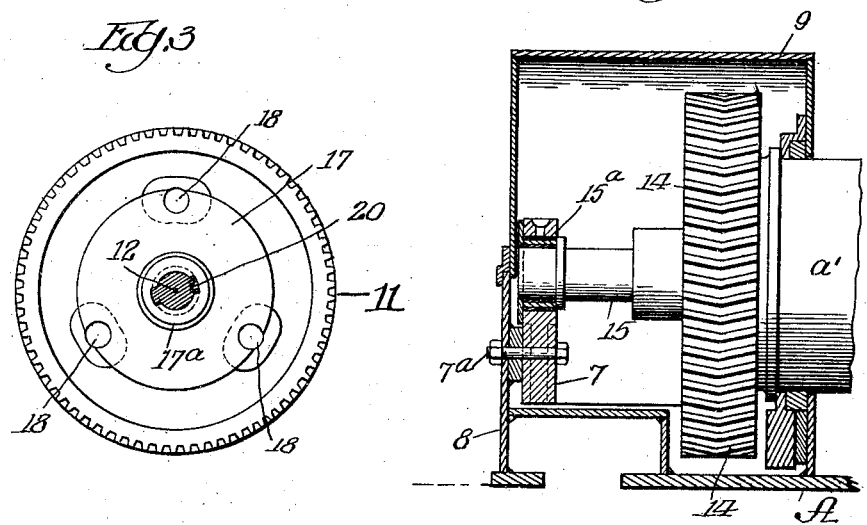

In the drawings: Fig. 1 is a plan of mechanism embodying the invention, the cover of the gear case being removed. Fig. 2 is a section taken on line 2—2 of Fig. 1. Fig. 3 is an elevation of one of the brake elements and the gear with which it is connected, so it can move axially into and out of engagement with another of the brake elements. Fig. 4 is a section taken on line 4—4 of Fig. 1. Fig. 5 is a section taken on line 5—5 of Fig. 4.

The invention is exemplified in connection with the frame A of a trolley which is usually mounted to run on overhead rails; a gear-case, adapted to contain lubricant, mounted on the truck-frame A, composed of a bottom section 8 and a removable cover-section 9; a shaft 6 which is usually driven by an electric motor; and a hoisting drum $a'$ for operating a hoisting cable to lift and lower a load, as well understood in the art.

The sections 8 and 9 of the gear-case are preferably built-up of sheet or plate metal, and a cast frame 7 for supporting the gearing in the case is fixedly held in the bottom section 8 of the case by bolts $7^a$. The drive-shaft 6 is adapted to drive the hoisting drum $a'$ through speed reducing gearing comprising a pinion 10 fixed to a shaft $6^a$ which is connected to shaft 6 by a flexible coupling $6^b$; a gear 11 which meshes with pinion 10 which is supported by and connected to drive a countershaft 12; a pinion 13 fixed to said countershaft; a gear 14 fixed to rotate with the hoisting drum $a'$; and a shaft 15 for said drum. Shaft $6^a$ is journalled in bearings mounted in the frame 7. Shaft 12 is journalled in bearings $12a$ and $12b$ which are also mounted on the frame 7. One end of shaft 15 is mounted in a bearing $15^a$ carried by the frame 7, and the other end of the shaft is mounted in any suitable manner on the truck-frame. Pinion 10 and gear 11 have intermeshing V-shaped or herringbone teeth, so that gear 11 will be held by said pinion against axial movement relatively to the shaft 12. Gear 11 is connected to drive shaft 12 through a brake-member 17. Studs 18, fixed in gear 11, extend through holes 19 in member 17. The member 17 is axially slidable on studs 18 to permit axial movement of said member to render it operative to brake the load. Member 17 has a hub $17^a$ which is threaded to a worm or screw 20 formed on the shaft 12, by which said member will be operated axially to make said member operative or inoperative to apply or release the brake. In operation gear 11 will be held against axial movement by the interlock between its teeth and pinion 10, while member 17 is free to move axially. The hub $11^a$ of gear 11 is fitted around the hub $17^a$ of brake-member 17.

A thrust ring 40 is held against axial movement by a bearing sleeve 41 which is fitted around shaft 12 and extends through bearing 12$^b$, to limit the axial movemet of member 17 toward the gear 11 to prevent said member from exerting longitudinal stresses against gear 11 while the gear is being operated to lower the load.

A split collar 24 is threaded to a screw 25 on one end of shaft 12 to adjust the position of sleeve 41 and thrust ring 40. By adjustment of collar 24, the axial throw of member 17 may be adjusted to prevent axial stresses against gear 11 during the operation of gear 11, when said member is released from the brake wheel.

A complementary member 21 is fixedly secured on the shaft 12. An axially movable brake-wheel 28 comprises a body or web 29 which is provided on its opposite faces with friction disks 30 and 31 which are adapted to be engaged by the contiguous friction faces of members 17 and 21 respectively, so that by forcing the member 17 towards the brake-member 21, said members will frictionally grip the brake-wheel. A bushing 28$^b$, usually of bronze, is provided in the rim of wheel 28 to form a bearing for the periphery of member 21, so said wheel will be carried by said member and free to be held stationary while said wheel revolves. The brake-wheel 28 is provided with ratchet-teeth 28$^a$, which are adapted to be engaged by a dog 34 to secure it against rotation in one direction when the brake is to be applied to the load. This dog is pivoted at 35 to a bar 7$^d$ of frame 7, and is automatically shifted into and out of operation with the ratchet, so that while the load is being lifted by rotation of the drum $a'$, the dog will be disengaged from the ratchet. Dog 34 is controlled by a link 36 which is pivoted to the dog at 31$^a$ and pivoted at 36$^a$ to a friction collar 37 which is mounted on a bushing 38 which is fixed to rotate with the shaft 6$^a$, and comprises a pair of sections 37$^a$ and 37$^b$ which are pivoted together at 37$^c$ and are pressed together to frictionally grip bushing 38, by a spring 37$^d$ which is coiled around a bolt 37$^e$. The bolt extends through lugs on said collar sections. The collar frictionally grips the bushing 38 to rotate the collar and automatically disengage dog 34 from ratchet 28 when the drum is being operated in the load-lifting direction, and to automatically shift the dog into engagement with the ratchet, when the direction of the rotation of shaft 6$^a$ is reversed to lower the load. A stop 42 positively limits the throw of dog 34 and collar 37.

When a load is being lifted, the drum will be driven through shaft 6$^a$, pinion 10, gear 11, studs 19, member 17, shaft 12, pinion 13, and gear 14. During the lifting of a load, shaft 6$^a$ will rotate in the direction which will cause the friction collar 37 to release the dog 34. During this operation, the member 17 will rotate in that direction which will cause the screw 20 to force it toward member 21 so that brake-wheel 28 will be clamped between said members and be rotated with gear 11. As a result, member 17, wheel 28, and member 21 will be secured to rotate together to drive pinion 13 to lift the load.

When the direction of the gearing is reversed, as in lowering a load, the direction of rotation of shaft 6 will be reversed, and collar 37 will be frictionally shifted to throw dog 34 into engagement with the teeth 28$^a$ of the brake-wheel. In lowering the load, it will be applied to rotate shaft 12 with its screw 20 faster than the gear 11 and member 17 are being operated by the motor, and as a result the screw will force member 17 towards brake-wheel 28 which is then stationary, and cause said wheel to be frictionally gripped between members 17 and 21, to retard the rotation of the hoisting drum and the lowering of the load. In raising and lowering a load, member 17 is forced away from thrust collar 40 and it is only when there is no load on the drum and the hoisting cable is being lowered, that said collar is engaged by said member.

In practice, it has been found that when the load brake is used in high speed mechanisms or for heavy work, the coacting friction surfaces at times are not sufficiently lubricated to keep the brake-members cool or prevent them from becoming hot, even though the gear-case contains lubricating oil. To overcome this heating, the invention provides for circulating oil between the friction faces of the brake-members while they are in operative engagement. The means for this purpose comprises a series of holes or ducts 43 which extend transversely through the hub of brake-member 21 and communicate with the spaces between the teeth of the pinion 13. The inclination of said teeth adjacent said holes deflects the oil axially through the holes 43 into the space 36 between brake-members 21 and 17. The outer faces of each of the friction disks 30 and 31 have formed therein tangential grooves 44 which extend between the inner and outer peripheries of the disks to conduct oil to the faces of the disks to the friction faces of the brake-members engaging with them. The inner faces of each disk are provided with similarly extending grooves 45 to conduct oil between the disks and the ratchet wheel. These grooves permit oil to flow outwardly between the disks and the ratchet wheel to keep the latter cool while the brake is applied. Holes 39 are formed through the rim of brake-wheel 28 and bushing 28$^b$ to permit oil at the outer margin of disk 30 to escape. As a result sufficient oil will be forced by gear 13 through holes 43 into the space within the brake wheel 28 and thence outwardly across the friction faces of the disks and brake-members to lubricate them and keep them cool.

The invention exemplifies a mechanical load brake in which the lubricant is forced between the friction faces of the brake members to prevent them from becoming overheated, as well as to lubricate them; also a construction in which a pinion with oblique teeth is utilized to force the oil to circulate across the friction faces.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a mechanical load brake, the combination of a shaft, mechanism for driving the shaft, hoisting means driven by the shaft, brake mechanism comprising a wheel and coacting brake members having friction-faces for gripping the wheel therebetween, one of said members being fixed to rotate with the shaft, and the other being movable axially to grip and release the brake wheel, means for forcing oil to the coacting faces between said members and the brake-wheel to effect lubrication and prevent overheating one of the friction faces having a duct therein to circulate oil across two of the coacting faces, and an enclosing case for the second mentioned mechanism adapted to contain oil to supply the latter to the forcing means.

2. In a mechanical load brake, the combination of a shaft, mechanism for driving the shaft, hoisting means driven by the shaft, brake mechanism comprising a wheel, coacting brake members at opposite sides of the wheel and friction disks between the wheel and members, one of the members being fixed to rotate with the shaft, and the other being movable axially to grip and release the brake wheel, said disks having grooves across their faces, means for forcing oil to the grooves and between said members and the disks, to effect lubrication and prevent overheating and an enclosing case for the second mentioned mechanism adapted to contain oil and to supply the same to the forcing means.

3. In a mechanical load brake, the combination of a driven shaft, hoisting means driven by the shaft, brake mechanism comprising a wheel and coacting brake members at the sides of the wheel having friction faces for gripping said wheel sides therebetween, one of the members being fixed to rotate with the shaft, and the other being movable axially to grip and release the brake wheel, one of the members having an oil duct therethrough to conduct oil to the friction faces to effect lubrication and prevent overheating, means for forcing oil through said duct, and an enclosing case for the mechanism adapted to contain oil and to supply the same to the forcing means.

4. In a mechanical load brake, the combination of a driven shaft, hoisting means driven by the shaft, brake mechanism comprising a wheel and coacting brake members at opposite sides of the wheel having friction faces for gripping said wheel therebetween, one of the members being fixed to rotate with the shaft, and the other being movable axially to grip and release the brake, one of the members having an oil duct therethrough to conduct oil to the friction faces to effect lubrication and prevent overheating, a wheel on the shaft having teeth for forcing oil through said duct, and an enclosing case for the mechanism adapted to contain oil and to supply the same to the teeth.

5. In a mechanical load brake, the combination of a driven shaft, hoisting mechanism, means for driving the hoisting means from the shaft comprising a pinion on said shaft, brake mechanism comprising a wheel and coacting members having friction faces for gripping the wheel therebetween, one of said members being fixed to the shaft and the other being axially movable to release and grip the brake-wheel, means in one of the brake-members forming a duct through which oil will be forced by the pinion to the friction faces, means for circulating the oil across said faces to effect lubrication and prevent overheating, and an enclosing case for the brake mechanism adapted to contain oil and to supply the same to the pinion.

6. In a mechanical load brake, the combination of a driven shaft, hoisting mechanism, means for driving the hoisting means from the shaft comprising a pinion on said shaft, brake-mechanism comprising a wheel and coacting members having friction faces for gripping the wheel therebetween, one of said members being fixed to the shaft and the other being axially movable to release and grip the brake-wheel, means in one of the brake-members forming a duct through which oil will be forced by the pinion to the friction faces, means for circulating oil across said faces and through the rim of the brake-wheel to effect lubrication and prevent overheating, and an enclosing case for the brake mechanism adapted to contain oil and to supply the same to the pinion.

7. In a mechanical load brake, the combination of a shaft, hoisting mechanism, means for driving the hoisting mechanism from the shaft comprising a pinion brake-mechanism on the shaft comprising a wheel and a coacting member having friction faces, a worm on the shaft to force the brake-wheel and member together, a gear for driving the axially movable member, and studs for slidably connecting the gear and axially movable member and effecting a driving connection therebetween.

8. In a mechanical load brake, the combination of a shaft, hoisting mechanism, means for driving the hoisting mechanism from the shaft comprising a pinion, brake mechanism on the shaft comprising a wheel and coacting members having friction faces, one of said members being fixed to the shaft and the other having a worm connection with the shaft to release and grip the brake-wheel, a gear for driving the axially movable member, the latter having a hub on which the gear is mounted, studs fixed in the gear and extending into the axially movable member to connect them slidably and effect a driving connection therebetween.

9. In a mechanical load brake, the combination of a shaft, hoisting mechanism driven by the shaft, mechanism on said shaft comprising a brake-wheel and a coacting rotatable member having friction-faces, one of which is movable axially on the shaft, a gear slidably connected to and adapted to drive said axially movable member, and an adjustable stop member on said shaft for adjusting the position of said axially movable member on the shaft.

Signed at Harvey, Illinois, this 31st day of May, 1928.

OSCAR L. COFFEY.